Patented June 9, 1953

2,641,591

UNITED STATES PATENT OFFICE 2,641,591

METHOD OF MANUFACTURING ACETONE-FORMALDEHYDE CONDENSATION PRODUCTS

Dmitry M. Gagarine, Danville, Va., assignor to Dan River Mills, Incorporated, a corporation of Virginia No Drawing. Application May 12, 1949, Serial No. 92,958

1 Claim. (Cl. 260—64)

In my copending application Serial No. 782,675, filed October 28, 1947, and allowed February 8, 1949 (now Patent No. 2,486,399, issued November 1, 1949), I have disclosed a process of producing a copolymer of starch-formaldehyde and acetone-formaldehyde, in which the starch is first reacted with the formaldehyde in the presence of alkali catalysts, and a mixture of formaldehyde and acetone, separately prepared, is then reacted with the starch-formaldehyde-alkali catalyst mixture and the resulting mixture promptly placed in a plurality of relatively small, strong containers wherein the condensation reaction is carried out to produce the final copolymer. This procedure with the production of the copolymer of starch-formaldehyde-acetone-formaldehyde gives optimum results when the final condensation reaction product is used on textiles for effecting shrinkage setting and other desirable characteristics. However, in some instances, it may be necessary to produce only the acetone-formaldehyde condensation product, instead of the copolymer, and I desire to cover in the present continuation-in-part application that adaptation of my improved process which is referred to but is not fully disclosed and is not claimed in my above copending application.

I recognize that it has been proposed in the prior art to produce an acetone-formaldehyde condensation reaction product for use on textiles, but the prior proposals have been subject to certain practical disadvantages that have limited commercial utilization of the process and product. Illustrative of the prior patents is Zwicky et al. Patent 2,159,875, patented May 23, 1939, wherein it is proposed to carry out the condensation reaction according to either of two alternative procedures. One of these procedures comprises the use of a strong alkali catalyst, such as, for example, caustic soda, and cooling the reaction with ice to prevent it from becoming too violent. The other procedure comprises the use of a milder alkali, i. e., calcined soda, and heating of the reaction mixture. Both of these procedures are characterized by difficulty of control of the reaction within a reasonably short time and without the reaction becoming too violent or getting out of control.

In accordance with my invention, I have discovered a procedure by which the condensation reaction between the acetone and formaldehyde may be carried out without the use of any cooling or heating of the reaction mixture and nevertheless with very accurate control of the condensation reaction to produce the desired end product; that is, a substantially neutral, water soluble product which may be applied to textiles, along with a regulated amount of alkali catalyst, to provide shrinkage resistance and other desired features in the textile.

The secret of success of this improved process resides in the use of a combination of a strong and a mild alkali catalyst to control the condensation reaction, and in dividing up the reaction mixture into a plurality of relatively small quantities, and maintaining each of these portions in a tightly closed container such as, for example, a steel drum, in which the condensation reaction is permitted to proceed under control over a period of time; following which the product may be shipped or used directly from the container.

My improved process comprises using a regulated amount of strong alkali such as caustic soda, which will give an initial quick reaction of limited extent; and using in combination therewith a regulated amount of mild alkali, such as, for example, sodium carbonate, which will cause a more protracted reaction during the time the reaction mixture is contained in the closed barrels. The caustic alkali or strong catalyst starts a condensation reaction which is exothermic in nature and the temperature of the mixture begins to rise. The amount of this strong catalyst is limited so that it soon exhausts, and the reaction does not become too violent in this initial stage. This part of the reaction may be carried out in an open vessel such as a large mixing tank; and after thorough mixing is obtained the product is drawn off into the necessary number of steel drums or barrels. By limiting the amount of the strong alkali catalyst, the usual violent reaction which accompanies use of such a catalyst with acetone and formaldehyde, is avoided at room temperature. No icing of the reaction vessel is needed, and no heat is required.

I have discovered by careful control of the amounts of the strong and weak alkalis that the initial reaction can be made to proceed quietly for a sufficient period of time to barrel or confine the product so that it will not produce an explosion or otherwise become too violent. Even so, the confining of the product in relatively small amounts is important, because considerable pressure and heat are generated by the subsequent exothermic condensation reaction. For example, in a typical case the temperature of the condensation mixture in the steel drums will rise to a maximum of about 97° C. and a pressure of about 16 pounds per square inch is produced in each of the steel drums.

Another feature of the process of my invention, obtained from the use of the carefully controlled amounts of the two catalysts, is that both of the catalysts are exhausted before the condensation reaction goes to completion. In other words, the end product is only partially condensed and is therefore not in an insoluble state, but, on the contrary, is completely miscible with water. Also, it is potentially reactive with the cellulose of the textile materials to which it is to be applied, in the presence of a small amount of alkali.

The alkali catalysts that may be used in the condensation reaction comprise strong alkalis such as sodium hydroxide and potassium hydroxide, and milder alkalis such as sodium carbonate, potassium carbonate, trisodium phosphate, potassium phosphate, and sodium sulfide. I have found it advantageous in commercial practice of the invention, to use a combination of sodium hydroxide and sodium carbonate. The strong alkali, e. g. sodium hydroxide, may be used in an amount of about 0.1% to 1.5%, and the mild alkali, e. g. sodium carbonate, about 0.2% to 3%, based on the total weight of the condensation reactants. A typical commercial example is approximately 0.25% of sodium hydroxide and 0.7% sodium carbonate.

The ratio of the amount of acetone to the amount of formaldehyde may be varied over a considerable range, such as 1 mol of acetone to 2 to 6 mols of formaldehyde. In the usual case the ratio is approximately 1 mol of acetone to about 2 to 4 mols of formaldehyde.

An illustrative but non-limiting example of the process of my invention for producing the acetone formaldehyde condensation product is as follows:

| | Pounds |
|---|---|
| 37% formaldehyde | 950 |
| Sodium hydroxide | 2.5 |
| Soda ash | 6.5 |
| Water | 37 |
| Acetone | 171 |

Mix the formaldehyde and acetone; dissolve the catalyst in water and add to the mixture. Other procedures for mixing may be used so long as the soda ash is first dissolved in the water or water and formaldehyde mixture, before mixing with the acetone. It is important to have the sodium hydroxide dissolved, as distinguished from solid sodium hydroxide which would not give the desired initial, mild and uniform reaction.

After mixing as above described, the final mixture is run into conventional 55-gallon steel drums which will withstand the pressure developed during the subsequent condensation reaction. The filling of these drums requires usually about thirty minutes total time; and I regulate the amount of sodium hydroxide catalyst so that it will not cause any violent reaction within this time limit. The initial reaction, as well as that which takes place in the steel drums for producing the acetone formaldehyde condensation product, is carried out at room temperature and without any refrigeration and without the addition of any artificial heat. After filling the drums are tightly closed.

In the steel drums, the condensation reaction proceeds rather slowly for about an hour and a half and then suddenly becomes vigorous, at which time the above mentioned temperature of 97° C. and pressure of about 16 pounds per square inch are established. This vigorous reaction then subsides and the pH diminishes over a period of about forty hours to a final pH value of about 7, at which time the catalysts employed have been exhausted. When the condensation reaction has stopped, the final product is a clear, colorless, syrupy liquid; it has only a faint odor of acetone and formaldehyde and has the following characteristics:

Specific gravity, 1.18 @ 25° C.
Flash point, none.
Water solubility, completely soluble @ 25° C.
Free formaldehyde by sodium sulfite method, about 6%.

This final reaction product may be diluted with water to any desired concentration and is ready for use in the treatment of textiles when accompanied by a small amount of alkali catalyst which will cause the product to react with the cellulose of the textiles.

The procedure described hereinabove in which the initial condensation reaction product is divided into a plurality of smaller units or amounts, contemplates commercial size production of the product of several hundred or several thousand gallons and which total amount may be divided up for filling the necessary number of 55-gallon steel drums. It will be appreciated, of course, that the invention is not limited to any specific number of subdivisions of the initial product and, in fact, if only a small amount, such as 100 gallons or less, of the product is made up at one time, it need not be subdivided, but may be contained in a single, suitable closed vessel.

The acetone-formaldehyde condensation product prepared as described above is suitable for treating textiles, such as cotton cloth for effecting shrinkage setting. The product may be applied as such or other materials may be added to it to give improved results. For example starch or any of the other high polymeric, polyhydric alcohols disclosed in my above copending application, e. g. cellulose, dextrines, polyvinyl alcohol and hydroxy ethyl cellulose may be added to the aqueous acetone formaldehyde solution with which the cloth is padded.

To cause the above solution to react with the cellulose of the cloth and produce cellulose ethers, a suitable catalyst is added to the solution. These catalysts include sodium hydroxide, potassium hydroxide and soda ash. In a typical case I use .2% soda ash or about .1% of the caustic alkali. The cloth is padded with the solution containing the catalyst, and dried at a temperature of about 250–350° F., to a residual moisture content of about 5% or less. The drying time under these conditions is usually about 20 to 60 seconds.

I claim:

A process of producing an acetone-formaldehyde condensation reaction product comprising preparing a solution of one mol of acetone, from about two to four mols of formaldehyde, approximately 0.1% to 1.5% of sodium hydroxide as a strong alkali catalyst and approximately 0.2% to 3% sodium carbonate as a milder alkali catalyst, based on the total weight of the condensation reactants, dividing this solution into a plurality of relatively small batches and confining each of these batches prior to any substantial reaction in separate tightly sealed substantially filled containers capable of withstanding pressures of about 16 pounds per square inch wherein the condensation reaction may take place over a period of time with a controlled rise in temperature and increase in pressure within each of the containers, and maintaining said reaction mixture within the containers until the catalysts have exhausted and the resulting acetone-formaldehyde condensation reaction product is quiescent, said batches being of such a size as will develop an autogenous pressure of about 16 pounds per square inch.

DMITRY M. GAGARINE.

References Cited in the file of this patent

UNITED STATES PATENTS

| Number | Name | Date |
|---|---|---|
| 1,502,945 | Ellis | July 29, 1924 |
| 1,683,535 | Ellis | Sept. 4, 1928 |
| 2,159,875 | Zwicky et al. | May 13, 1939 |
| 2,486,399 | Gagarine | Nov. 1, 1949 |
| 2,495,233 | Drisch et al. | Jan. 24, 1950 |

OTHER REFERENCES

Houwink Elastomers and Plastomers (Elsevier), vol. 2, pp. 119 and 133.